US007616789B2

(12) United States Patent
Oosawa

(10) Patent No.: US 7,616,789 B2
(45) Date of Patent: Nov. 10, 2009

(54) METHOD AND APPARATUS FOR FORMING IMAGES AND IMAGE FURNISHING SERVICE SYSTEM

(75) Inventor: Akira Oosawa, Kaisei-machi (JP)

(73) Assignee: FUJIFILM Corporation, Tokyo (JP)

( * ) Notice: Subject to any disclaimer, the term of this patent is extended or adjusted under 35 U.S.C. 154(b) by 769 days.

(21) Appl. No.: 10/436,117

(22) Filed: May 13, 2003

(65) Prior Publication Data

US 2003/0210813 A1 Nov. 13, 2003

(30) Foreign Application Priority Data

May 13, 2002 (JP) .............................. 2002-136513
Mar. 24, 2003 (JP) .............................. 2003-080637

(51) Int. Cl.
*G06K 9/00* (2006.01)

(52) U.S. Cl. ...................................... 382/128
(58) Field of Classification Search ................. 382/128, 382/294, 131, 132; 358/448; 348/65, 580; 357/448
See application file for complete search history.

(56) References Cited

U.S. PATENT DOCUMENTS

| 5,359,513 A | 10/1994 | Kano et al. |
| 5,790,690 A | 8/1998 | Doi et al. |
| 5,982,953 A * | 11/1999 | Yanagita et al. ............. 382/294 |
| 6,009,212 A * | 12/1999 | Miller et al. ................. 382/294 |
| 6,011,862 A | 1/2000 | Doi et al. |
| 6,594,378 B1 * | 7/2003 | Li et al. ....................... 382/128 |
| 6,611,630 B1 * | 8/2003 | Miller et al. ................. 382/293 |
| 6,679,399 B2 * | 1/2004 | Franjo et al. ................. 220/562 |
| 6,975,763 B2 | 12/2005 | Shiota |
| 7,058,210 B2 * | 6/2006 | Mundy et al. ............... 382/128 |

FOREIGN PATENT DOCUMENTS

| JP | 2001-291108 | 10/2001 |
| JP | 2002-8350 A | 1/2002 |
| JP | 2002-024811 | 1/2002 |
| JP | 2002-32735 A | 1/2002 |
| JP | 2002-158923 A | 5/2002 |
| WO | WO 98/36683 A1 | 8/1998 |

* cited by examiner

*Primary Examiner*—Brian P Werner
*Assistant Examiner*—Claire Wang
(74) *Attorney, Agent, or Firm*—Sughrue Mion, PLLC

(57) ABSTRACT

In a first image forming method, a medical image of an object is inputted, and a normal structure image, which corresponds to the inputted medical image and represents a normal structure of the object, is artificially formed. In a second image forming method, a normal image signal corresponding to a normal image, which is a medical image representing a normal structure of an object, is acquired, a plurality of structure altering vectors for altering the structure of the object are set, and an addition process for adding the plurality of the structure altering vectors to the normal image signal is performed, and a normal structure image signal, which represents a normal structure image of the object, is formed.

14 Claims, 12 Drawing Sheets

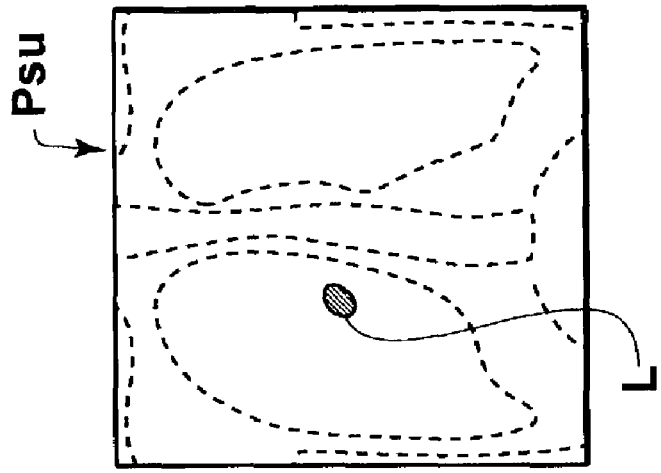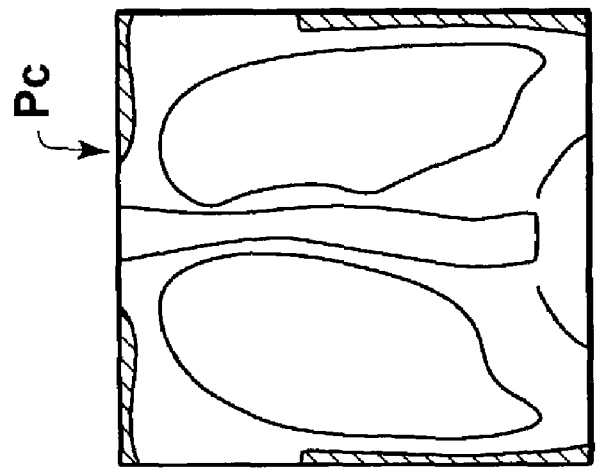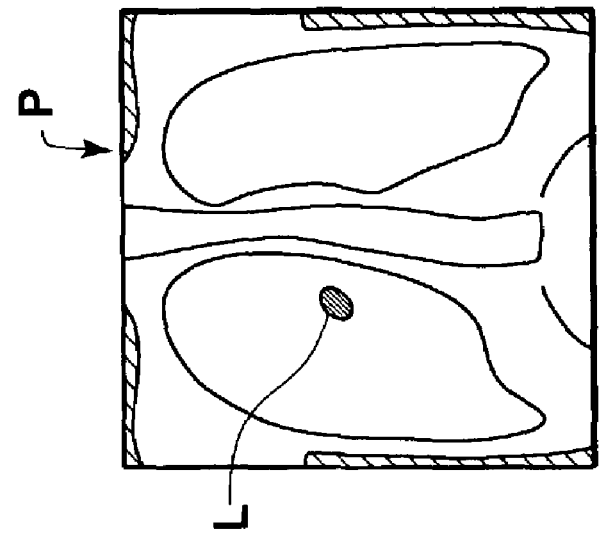

METHOD AND APPARATUS FOR FORMING IMAGES AND IMAGE FURNISHING SERVICE SYSTEM

BACKGROUND OF THE INVENTION

1. Field of the Invention

This invention relates to an image forming method and apparatus for aiding detection of an abnormal pattern candidate embedded in a medical image, a computer program for causing a computer to execute the image forming method, and a computer readable recording medium, on which the computer program has been recorded. This invention also relates to an image selecting method and apparatus, an image output method and apparatus, and an image furnishing service system.

2. Description of the Related Art

In medical fields, operations have heretofore been performed, wherein at least two medical images of a certain patient, which medical images have been recorded at different points of time, are compared with each other, a difference between the medical images is found, and an abnormal pattern is detected in accordance with the thus found difference. Also, in accordance with the thus found difference, a state of progress of a disease or a state of cure of a disease is ascertained, and a plan of medical treatment is determined.

As a technique for detecting an abnormal pattern by comparing medical images with each other, a technique for detecting an abnormal pattern, such as a lung cancer in its early stage, which abnormal pattern is small in size and cannot be found easily, has been proposed in, for example, Japanese Unexamined Patent Publication No. 2002-158923. With the proposed technique, a difference between two medical images, which have been recorded at different points of time, is calculated with, for example, a subtraction process, in which image signal components representing corresponding pixels in the medical images are subtracted from each other. Also, a region embedded in a difference image representing the difference, i.e. a temporal (time difference) subtraction image, which region is associated with pixel values larger than a predetermined value or has a characteristic shape, e.g. an approximately circular shape, is detected as an abnormal pattern candidate.

As for the two time series images, which have been recorded at different points of time and are to be compared with each other, a shift of an object in the patient occurs due to, for example, a change in orientation of the patient at the time of the image recording operation. Therefore, in the aforesaid technique for detecting an abnormal pattern, ordinarily, position matching processing is performed on the two images, which are to be compared with each other.

As techniques for performing the position matching processing, a technique for performing global position matching processing (a linear transform, such as an affine transform), a technique for performing local position matching processing, and a technique for performing a combination of the global position matching processing and the local position matching processing have been proposed in, for example, U.S. Pat. Nos. 5,359,513, 5,790,690 and 6,011,862. With the global position matching processing, a rotating processing, parallel translation, and image size enlargement or reduction processing are performed on an entire image area of at least either one of the two images of a single object, which images are to be compared with each other. With the local position matching processing, nonlinear strain transform processing, i.e. warping, (e.g. nonlinear strain transform processing utilizing curve fitting with two-dimensional polynomials) is performed in accordance with corresponding position relationship, which has been obtained from template matching performed with respect to each of local area limited regions. Also, a technique for performing position re-matching processing with respect to a local area limited region, which is associated with a high degree of shift, and regions neighboring with the local area limited region has been proposed in, for example, Japanese Unexamined Publication No. 2002-32735.

However, with the aforesaid techniques for performing the position matching processing, the position matching processing is performed on the images, which have been projected in two-dimensional directions. Therefore, in cases where a large three-dimensional fluctuation (such as forward inclination, backward inclination, or lateral turning) occurs due to, for example, a change in patient orientation between the time series images, the problems occur in that the position matching cannot be achieved accurately, an artifact occurs in the difference image, and an image appropriate for the detection of an abnormal pattern cannot be obtained.

Also, in cases where a medical image of a certain patient had not been recorded in the past, or in cases where a medical image of a certain patient, which was recorded in the past, is not available, the problems occur in that, since the image to be compared with the newly recorded image cannot be obtained, the technique for image comparison (particularly, the technique for detecting an abnormal pattern by use of the difference image), which has the effect of detecting a small-sized abnormal pattern that cannot ordinarily be found easily, cannot be utilized.

SUMMARY OF THE INVENTION

The primary object of the present invention is to provide an image forming method, which enables an abnormal pattern to be detected more accurately through image comparison than with conventional techniques for detecting an abnormal pattern through image comparison.

Another object of the present invention is to provide an image forming apparatus for carrying out the image forming method.

A further object of the present invention is to provide a computer program for causing a computer to execute the image forming method.

A still further object of the present invention is to provide a computer readable recording medium, on which the computer program has been recorded.

Another object of the present invention is to provide an image selecting method, which enables an abnormal pattern to be detected more accurately through image comparison than with conventional techniques for detecting an abnormal pattern through image comparison.

A further object of the present invention is to provide an image selecting apparatus for carrying out the image selecting method.

A still further object of the present invention is to provide an image output method, which enables an abnormal pattern to be detected more accurately through image comparison than with conventional techniques for detecting an abnormal pattern through image comparison.

Another object of the present invention is to provide an image output apparatus for carrying out the image output method.

The specific object of the present invention is to provide an image furnishing service system, which enables an abnormal pattern to be detected more accurately through image comparison than with conventional techniques for detecting an abnormal pattern through image comparison.

The present invention provides a first image forming method, comprising the steps of:

i) inputting a medical image of an object, and ii) artificially forming a normal structure image, which corresponds to the inputted medical image and represents a normal structure of the object.

The present invention also provides a first image forming apparatus, comprising:

i) object image input means for inputting a medical image of an object, and ii) normal structure image forming means for artificially forming a normal structure image, which corresponds to the inputted medical image and represents a normal structure of the object.

The present invention further provides a second image forming method, comprising the steps of:

i) acquiring a normal image signal corresponding to a normal image, which is a medical image representing a normal structure of an object, ii) setting a plurality of structure altering vectors for altering the structure of the object, and iii) performing an addition process for adding the plurality of the structure altering vectors to the normal image signal, whereby a normal structure image signal, which represents a normal structure image of the object, is formed.

The second image forming method in accordance with the present invention may be modified such that the plurality of the structure altering vectors are set such that the normal structure image is obtained as a normal structure image, which corresponds to a medical image having been inputted for detection of an abnormal pattern and is to be compared with the medical image having been inputted for the detection of an abnormal pattern.

The present invention still further provides a second image forming apparatus, comprising:

i) normal image signal acquiring means for acquiring a normal image signal corresponding to a normal image, which is a medical image representing a normal structure of an object, ii) structure altering vector setting means for setting a plurality of structure altering vectors for altering the structure of the object, and iii) structure altering vector adding means for performing an addition process for adding the plurality of the structure altering vectors to the normal image signal in order to form a normal structure image signal, which represents a normal structure image of the object.

The term "normal structure image" as used herein means the image, which has a structure (i.e., a shape and a texture) obtained in cases where tissues of the object are normal.

As the normal image, for example, an image, which is constituted of a statistical mean shape and a statistical mean texture of the object obtained by the utilization of a plurality of different normal structure images as samples, may be employed. Also, as the structure altering vectors, eigenvectors of the shape and the texture, which eigenvectors are calculated by performing principal component analyses with respect to the shape and the texture of the object, may be employed.

The second image forming apparatus in accordance with the present invention may be modified such that the structure altering vector setting means sets the plurality of the structure altering vectors such that the normal structure image is obtained as a normal structure image, which corresponds to a medical image having been inputted for detection of an abnormal pattern and is to be compared with the medical image having been inputted for the detection of an abnormal pattern.

The term "normal structure image, which corresponds to an inputted medical image and is to be compared with the inputted medical image" as used herein means the image, which is to be compared with the inputted medical image for the detection of an abnormal pattern in the inputted medical image in accordance with a difference found from the comparison. Specifically, the term "normal structure image, which corresponds to an inputted medical image and is to be compared with the inputted medical image" as used herein means the image, which is assumed to be obtained in cases where the object is normal, i.e. the image, in which the tissue structure represented by the shape and the texture of the object is approximately identical with the tissue structure, except for a diseased part, in the inputted medical image.

The present invention also provides a first image output method, comprising the steps of:

i) artificially forming a normal structure image, which corresponds to an inputted medical image of an object and represents a normal structure of the object, and ii) outputting the formed normal structure image and the inputted medical image.

The present invention further provides a first image output apparatus, comprising:

i) normal structure image forming means for artificially forming a normal structure image, which corresponds to an inputted medical image of an object and represents a normal structure of the object, and ii) output means for outputting the normal structure image, which has been formed by the normal structure image forming means, and the inputted medical image.

The present invention still further provides an image selecting method, comprising the steps of:

i) storing a plurality of different normal structure image signals corresponding to a plurality of different normal structure images, which have been formed artificially and represent normal structures of objects, and ii) selecting a normal structure image signal representing a normal structure image, which approximately coincides with an inputted medical image of an object, from among the plurality of the different normal structure image signals.

The present invention also provides an image selecting apparatus, comprising:

i) normal structure image signal storing means for storing a plurality of different normal structure image signals corresponding to a plurality of different normal structure images, which have been formed artificially and represent normal structures of objects, and ii) normal structure image selecting means for selecting a normal structure image signal representing a normal structure image, which approximately coincides with an inputted medical image of an object, from among the plurality of the different normal structure image signals.

By way of example, the normal structure image selecting means may employ a technique for retrieving an approximately identical image by the utilization of a histogram of an image signal (an image density signal), as described in, for example, Japanese Unexamined Patent Publication No. 2002-008350. Specifically, for example, a histogram of an image density signal may be formed with respect to each of the object image signal and the normal structure image signals having been stored, and a normal structure image signal whose histogram is closest to the histogram of the object image signal may be selected. In order for a judgment to be made as to whether the histograms are or are not approximately identical with each other, for example, a variance value of the difference between the histogram of the object image signal and the histogram of the normal structure image signal may be calculated, and it may be judged that the histogram of the normal structure image signal, which histogram is associated with a small variance value, is approximately identical with the histogram of the object image signal.

The present invention further provides a second image output method, comprising the steps of:

i) storing a plurality of different normal structure image signals corresponding to a plurality of different normal structure images, which have been formed artificially and represent normal structures of objects, ii) selecting a normal structure image signal representing a normal structure image, which approximately coincides with an inputted medical image of an object, from among the plurality of the different normal structure image signals, and iii) outputting the normal structure image, which is represented by the thus selected normal structure image signal, and the inputted medical image.

The present invention still further provides a second image output apparatus, comprising:

i) normal structure image signal storing means for storing a plurality of different normal structure image signals corresponding to a plurality of different normal structure images, which have been formed artificially and represent normal structures of objects, ii) normal structure image selecting means for selecting a normal structure image signal representing a normal structure image, which approximately coincides with an inputted medical image of an object, from among the plurality of the different normal structure image signals, and iii) output means for outputting the normal structure image, which is represented by the normal structure image signal having been selected by the normal structure image selecting means, and the inputted medical image.

In the first and second image output apparatuses in accordance with the present invention, the output means may be display means for displaying the images on a cathode ray tube (CRT) display device, or the like. Alternatively, the output means may be hard copy output means for outputting the images as hard copies on a recording medium, such as paper or film. As another alternative, the output means may be network output means for outputting the images to a network.

The display means or the hard copy output means may output the inputted medical image and the normal structure image, which has been formed by the normal structure image forming means, or the normal structure image, which has been selected by the normal structure image selecting means, such that the images stand side by side. Alternatively, the display means or the hard copy output means may output the inputted medical image and the normal structure image separately. Also, the display means or the hard copy output means may output the plurality of the images on one display screen or one sheet of the recording medium. Alternatively, the display means or the hard copy output means may output the plurality of the images on different display screens or different sheets of the recording media. Further, besides the images, the output means may output various kinds of information, such as information concerning the images and patient information. The output means may output the images and the various kinds of information together with each other or separately.

Also, each of the first and second image output apparatuses in accordance with the present invention may be modified such that the image output apparatus further comprises image storing means for storing normal structure images, which have been outputted by the output means, such that it is clear which normal structure image corresponds to which inputted medical image.

The image storing means may store both the inputted medical images and the normal structure images, which have been formed by the normal structure image forming means, or the normal structure images, which have been selected by the normal structure image selecting means. Alternatively, in cases where the inputted medical images have already been stored, the image storing means may store only the normal structure images, which have been formed by the normal structure image forming means, or the normal structure images, which have been selected by the normal structure image selecting means.

Further, each of the first and second image output apparatuses in accordance with the present invention may be modified such that the image output apparatus further comprises abnormal pattern detecting means for detecting an abnormal pattern, which is embedded in the inputted medical image, in accordance with the normal structure image, which has been outputted by the output means, and inputted medical image.

The abnormal pattern detecting means may comprise inter-image operation processing means for performing inter-image operation processing for calculating a difference between the inputted medical image and the normal structure image, which images have been outputted by the output means, in order to obtain a difference image representing the difference, and detection means for detecting a region of the difference image, which region has pixel values larger than a predetermined value, as an abnormal pattern candidate.

As the inter-image operation processing, a subtraction process, in which pixel values of corresponding pixels in the two images are subtracted from each other, should preferably be employed. In such cases, the subtraction process may be a simple subtraction process. Alternatively, the subtraction process may be a weighted subtraction process. The difference image obtained from the subtraction process is ordinarily referred to as the subtraction image.

The pixel values of the abnormal pattern candidate take positive values or negative values in accordance with the order of the operation processing at the time of the inter-image operation processing (e.g., whether the operation processing of Z1-Z2 or the operation processing of Z2-Z1 is performed, wherein Z1 and Z2 represents the two images), and in accordance with the state of gradation of the difference image (e.g., whether the gradation is reversal gradation or ordinary gradation). The difference between the two images may be processed in one of various ways in accordance with embodiments. In the techniques in accordance with the present invention, the difference between the two images should preferably be represented by absolute values.

The present invention also provides a first computer program for causing a computer to execute image forming processing, the computer program comprising the procedures for:

i) inputting a medical image of an object, and ii) artificially forming a normal structure image, which corresponds to the inputted medical image and represents a normal structure of the object.

The present invention further provides a second computer program for causing a computer to execute image forming processing, the computer program comprising the procedures for:

i) acquiring a normal image signal corresponding to a normal image, which is a medical image representing a normal structure of an object, ii) setting a plurality of structure altering vectors for altering the structure of the object, and iii) performing an addition process for adding the plurality of the structure altering vectors, which have been set, to the normal image signal, which has been acquired, whereby a normal structure image signal, which represents a normal structure image of the object, is formed.

The present invention still further provides a first computer readable recording medium, on which the first computer program in accordance with the present invention has been recorded.

The present invention also provides a second computer readable recording medium, on which the second computer program in accordance with the present invention has been recorded.

A skilled artisan would know that the computer readable recording medium is not limited to any specific type of storage devices and includes any kind of device, including but not limited to CDs, floppy disks, RAMS, ROMs, hard disks, magnetic tapes and internet downloads, in which computer instructions can be stored and/or transmitted. Transmission of the computer code through a network or through wireless transmission means is also within the scope of the present invention. Additionally, computer code/instructions include, but are not limited to, source, object, and executable code and can be in any language including higher level languages, assembly language, and machine language.

Each of the first and second computer programs in accordance with the present invention may be recorded on the computer readable recording medium and read from the computer readable recording medium. In this manner, the computer program is capable of being installed in the computer and executed by the computer. Alternatively, the computer program may be stored in a server, which is connected to a network, such that the computer program is capable of being down-loaded from the server, and the computer program may be down-loaded from the server to a computer and installed in the computer.

The present invention further provides a first image furnishing service system, comprising:

i) at least one client capable of sending an object image signal, which represents a medical image of an object, and ii) a server connected through a network to the client and provided with a first image forming apparatus in accordance with the present invention for forming a normal structure image, which corresponds to the medical image represented by the object image signal and represents a normal structure of the object, in accordance with the object image signal having been sent from the client, the server sending the formed normal structure image to the client.

The present invention still further provides a second image furnishing service system, comprising:

i) at least one client capable of sending an object image signal, which represents a medical image of an object, and ii) a server connected through a network to the client and provided with an image selecting apparatus in accordance with the present invention for selecting a normal structure image signal representing a normal structure image, which approximately coincides with the medical image represented by the object image signal having been sent from the client, from among a plurality of different normal structure image signals corresponding to a plurality of different normal structure images, which have been formed artificially and represent normal structures of objects, the server sending the selected normal structure image signal to the client.

The term "image" as used herein means the image itself and often means the image signal representing the image.

With the first image forming method and apparatus in accordance with the present invention, wherein the normal structure image, which corresponds to the inputted medical image of the object and represents the normal structure of the object, is formed artificially, the normal structure image, which is free from any shift of the object and is to be compared with the inputted medical image, is capable of being obtained. Therefore, an artifact does not occur in the difference image representing the difference between the inputted medical image and the formed normal structure image. Accordingly, the detection of an abnormal pattern through image comparison is capable of being performed accurately. Also, in cases where an image, which has been recorded and represents the normal structure of the object, e.g. an image recorded in the past before the occurrence of a disease, is not available, since the normal structure image representing the normal structure of the object is capable of being obtained, the detection of an abnormal pattern through image comparison is capable of being performed with respect to a patient, for which the detection of an abnormal pattern through image comparison could not heretofore be performed due to the unavailability of the past image. Further, the formed normal structure image is capable of being utilized for making a diagnosis and as a material for medical research and medical training.

With the second image forming method and apparatus in accordance with the present invention, the normal image signal corresponding to the normal image, which is the medical image representing the normal structure of the object, is acquired, and the plurality of the structure altering vectors for altering the structure of the object in the medical image are set. Also, the addition process is performed for adding the plurality of the structure altering vectors to the normal image signal, and the normal structure image signal, which represents the normal structure image of the object, is thereby formed. Therefore, in cases where the plurality of the structure altering vectors are prepared, an approximately arbitrary normal structure image is capable of being formed as the normal structure image of the object. Accordingly, a normal structure image taking on a desired form is capable of being formed accurately. Also, the formed normal structure image is capable of being utilized widely as an image for making a diagnosis in the medical fields, particularly as an image for image comparison, as a material for medical research and training, and the like.

With the second image forming method and apparatus in accordance with the present invention, the plurality of the structure altering vectors may be set such that the normal structure image is obtained as the normal structure image, which corresponds to the medical image having been inputted for detection of an abnormal pattern and is to be compared with the medical image having been inputted for the detection of an abnormal pattern. In such cases, with respect to each of various inputted medical images, the normal structure image corresponding to the inputted medical image is capable of being prepared for image comparison. Therefore, in cases where a medical image recorded in the past (hereinbelow referred to as the past image), which image is capable of acting as the normal structure image, is not available, the detection of an abnormal pattern through image comparison is capable of being performed. Also, heretofore, in cases where the medical image described above and the past image are compared with each other, the accuracy of the image comparison has been affected adversely by deviations in object shape and gradation occurring between the two images due to a difference in image recording conditions. However, with the modifications of the second image forming method and apparatus in accordance with the present invention, the object shape and the gradation in the formed normal structure image are capable of being set such that the object shape and the gradation approximately coincide with the object shape and the gradation in the inputted medical image, which is represented by the object image signal. Therefore, deviations in object shape and gradation are capable of being suppressed, and the image comparison between the formed normal structure image and the inputted medical image is capable of being made more accurately than with conventional techniques.

With the image selecting method and apparatus in accordance with the present invention, the plurality of the different normal structure image signals corresponding to the plurality of the different normal structure images, which have been formed artificially and represent normal structures of objects, are stored, and the normal structure image signal representing the normal structure image, which approximately coincides with the inputted medical image of the object, is selected from among the plurality of the different normal structure image signals. Therefore, as in the cases of the first image forming method and apparatus in accordance with the present invention, in cases where an image, which has been recorded and represents the normal structure of the object, e.g. an image recorded in the past before the occurrence of a disease, is not available, since the normal structure image representing the normal structure of the object is capable of being obtained, the detection of an abnormal pattern through image comparison is capable of being performed with respect to a patient, for which the detection of an abnormal pattern through image comparison could not heretofore be performed due to the unavailability of the past image. Further, the selected normal structure image is capable of being utilized for making a diagnosis and as a material for medical research and medical training.

With the first image output method and apparatus in accordance with the present invention, the normal structure image, which corresponds to the inputted medical image of the object and represents the normal structure of the object, is formed artificially, and the formed normal structure image and the inputted medical image are outputted. Therefore, the first image output method and apparatus in accordance with the present invention are capable of being utilized for image comparison, various diagnoses, and research, in which the normal structure image and the inputted medical image are utilized as one set.

With the second image output method and apparatus in accordance with the present invention, the normal structure image signal representing the normal structure image, which approximately coincides with the inputted medical image of the object, is selected from among the plurality of the different normal structure image signals corresponding to the plurality of the different normal structure images, which have been formed artificially and represent normal structures of objects, and the normal structure image, which is represented by the thus selected normal structure image signal, and the inputted medical image are outputted. Therefore, as in the cases of the first image output method and apparatus in accordance with the present invention, the second image output method and apparatus in accordance with the present invention are capable of being utilized for image comparison, various diagnoses, and research, in which the normal structure image and the inputted medical image are utilized as one set.

With each of the first and second image output apparatuses in accordance with the present invention, wherein the output means is the display means for displaying the images, the inputted medical image and the normal structure image corresponding to the inputted medical image are capable of being displayed on the display screen and compared with each other through visual confirmation.

With each of the first and second image output apparatuses in accordance with the present invention, the image output apparatus may further comprise the image storing means for storing the normal structure images, which have been outputted by the output means, such that it is clear which normal structure image corresponds to which inputted medical image. In such cases, the normal structure image corresponding to the inputted medical image is capable of being stored, and the operation for forming or selecting the normal structure image need not be performed again with respect to the medical image having been inputted one time. Therefore, the diagnosis and the medical treatment are capable of being performed smoothly.

Each of the first and second image output apparatuses in accordance with the present invention may be modified such that the image output apparatus further comprises the abnormal pattern detecting means for detecting an abnormal pattern, which is embedded in the inputted medical image, in accordance with the normal structure image, which has been outputted by the output means, and the inputted medical image. With each of the modifications of the first and second image output apparatuses in accordance with the present invention, in cases where an abnormal pattern detecting technique utilizing the past image and the normal structure image is employed, with respect to a patient, for which the abnormal pattern detecting technique could not heretofore be performed due to the unavailability of the past image, the normal structure image corresponding to the medical image of the patient is capable of being formed artificially or selected. Therefore, the abnormal pattern detecting technique is capable of being utilized with respect the patient described above. Accordingly, the detection of an abnormal pattern is capable of being performed accurately.

With each of the first and second image furnishing service systems in accordance with the present invention, in accordance with the object image signal, which represents the medical image of the object and has been sent from the client, the server artificially forms the normal structure image signal representing the normal structure image, which corresponds to the medical image represented by the object image signal and represents the normal structure of the object, or selects the normal structure image signal from among the plurality of the normal structure image signals. Also, the server sends the obtained normal structure image signal to the client. Therefore, a user who does not have the image forming apparatus or the image selecting apparatus in accordance with the present invention is capable of obtaining the normal structure image corresponding to the medical image of the object. Accordingly, the user, who does not have a space for installation of the image forming apparatus or the image selecting apparatus in accordance with the present invention or cannot purchase the image forming apparatus or the image selecting apparatus in accordance with the present invention for reasons of economy, is capable of obtaining the normal structure image signal for the object and utilizing the normal structure image signal for diagnosis, research, training, and the like.

BRIEF DESCRIPTION OF THE DRAWINGS

FIG. 9A is an explanatory view showing an inputted medical image P, FIG. 9B is an explanatory view showing a normal structure image Pc, FIG. 9C is an explanatory view showing a subtraction image Psu.

DESCRIPTION OF THE PREFERRED EMBODIMENTS

The present invention will hereinbelow be described in further detail with reference to the accompanying drawings.

Figure 1:
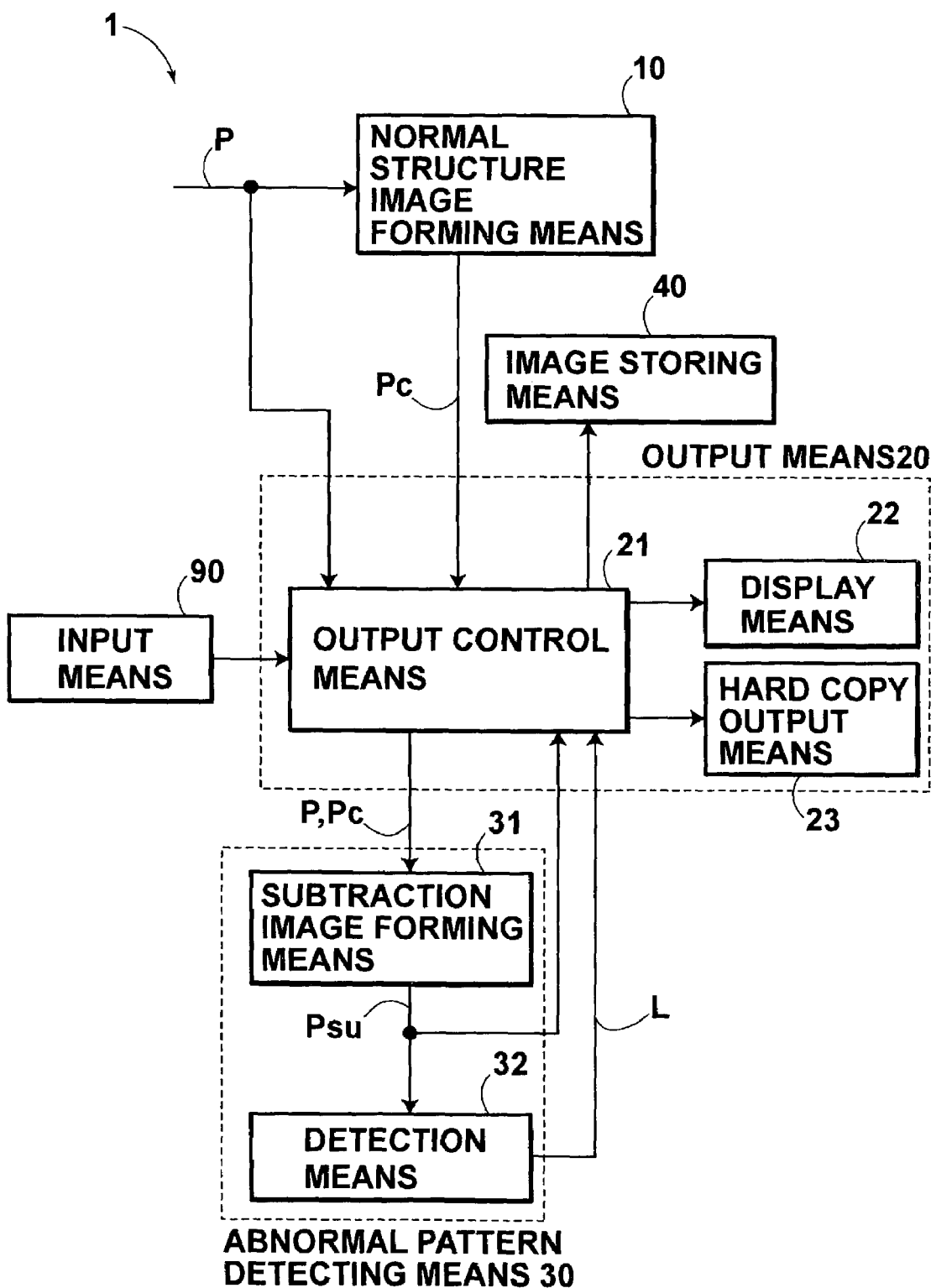
FIG. 1 is a block diagram showing a first embodiment of the image output apparatus in accordance with the present invention.

FIG. 1 is a block diagram showing a first embodiment of the image output apparatus in accordance with the present invention.

With reference to FIG. 1, an image output apparatus 1, which is a first embodiment of the image output apparatus in accordance with the present invention, comprises normal structure image forming means 10 for artificially forming a normal structure image Pc, which corresponds to an inputted medical image P of an object and represents a normal structure of the object. The image output apparatus 1 also comprises output means 20 for outputting the inputted medical image P, the normal structure image Pc having been formed by the normal structure image forming means 10, a subtraction image Psu having been formed by subtraction image forming means 31, which will be described later, various other images, and various kinds of information. (The images and the information outputted by the output means 20 will hereinbelow be referred to as the output information.) The image output apparatus 1 further comprises abnormal pattern detecting means 30 for detecting a region of an abnormal pattern candidate, which is embedded in the medical image P, in accordance with the medical image P, which has been outputted by the output means 20, and the normal structure image Pc, which has been formed by the normal structure image forming means 10. The image output apparatus 1 still further comprises image storing means 40 for storing a plurality of normal structure images Pc, Pc, . . . , such that it is clear which normal structure image Pc corresponds to which inputted medical image P. The image output apparatus 1 also comprises input means 90 for inputting instructions for performing various operations.

The output means 20 comprises output control means 21 for controlling the outputting of the output information. The output means 20 also comprises display means 22 for displaying the output information. The output means 20 further comprises hard copy output means 23 for outputting the output information as a hard copy.

The abnormal pattern detecting means 30 comprises the subtraction image forming means (inter-image operation processing means) 31 for performing a subtraction process on the medical image P and the normal structure image Pc in order to obtain the subtraction image Psu, which is a difference image representing a difference between the medical image P and the normal structure image Pc. The abnormal pattern detecting means 30 also comprises detection means 32 for detecting a region embedded in the subtraction image Psu, which region is associated with pixel values larger than a predetermined value, as an abnormal pattern candidate.

The image output apparatus in accordance with the present invention need not necessarily be provided with the hard copy output means 23 and the input means 90.

Figure 2:
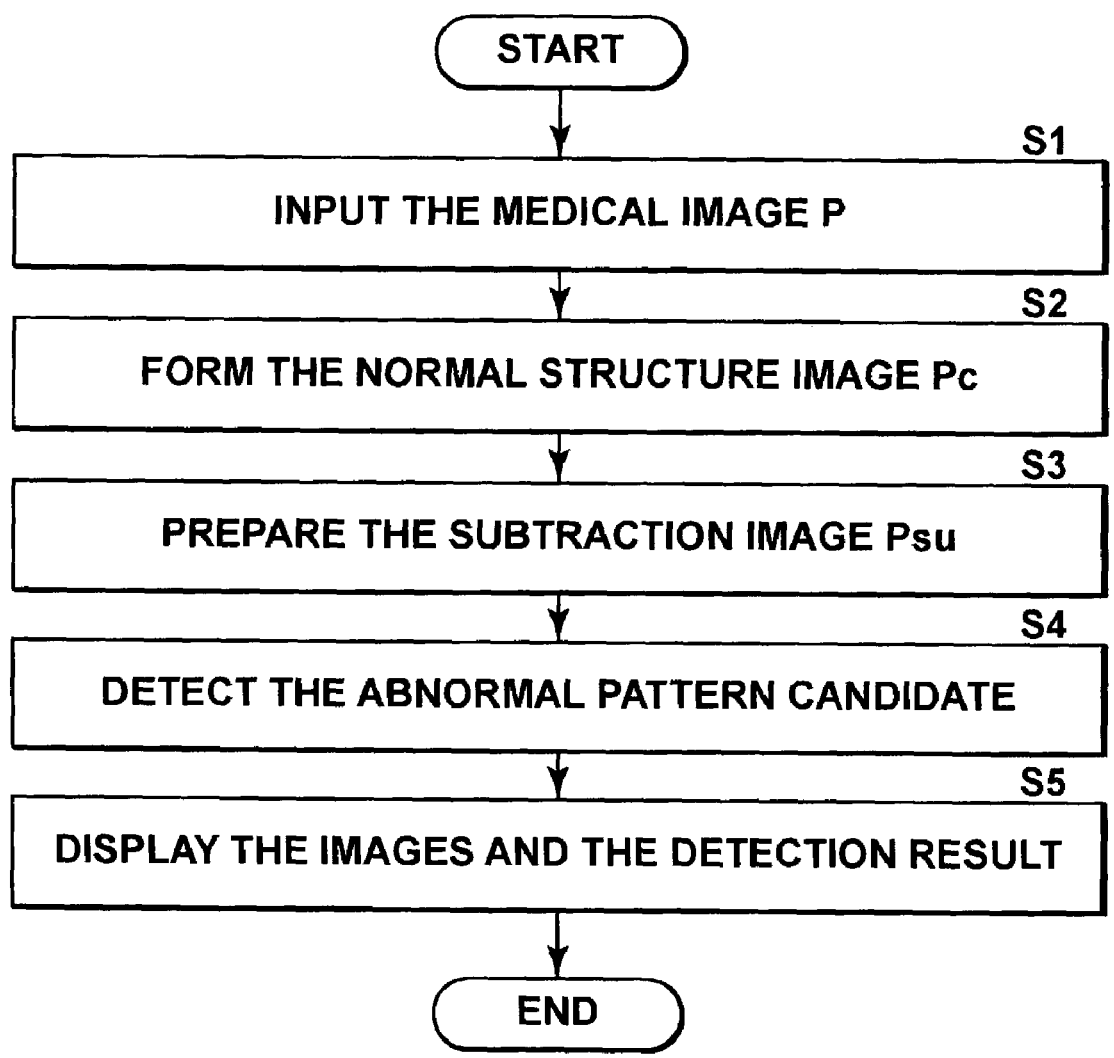
FIG. 2 is a flow chart showing how processing is performed in the first embodiment of the image output apparatus in accordance with the present invention.

How the image output apparatus 1, which is the first embodiment of the image output apparatus in accordance with the present invention, operates will be described hereinbelow. FIG. 2 is a flow chart showing how processing is performed in the first embodiment of the image output apparatus in accordance with the present invention. With reference to FIG. 2, in a step S1, the medical image P of the object is inputted into the image output apparatus 1. In a step S2, the normal structure image forming means 10 artificially forms the normal structure image Pc, which corresponds to the inputted medical image P. The normal structure image Pc is the image, which is assumed to be obtained in cases where the structure of the object is normal. The normal structure image Pc has a shape and a texture, which are approximately identical with the shape and the texture of the object, except for a diseased part, in the medical image P. The medical image P and the normal structure image Pc are fed into the output control means 21. The output control means 21 feeds the medical image P and the normal structure image Pc into the subtraction image forming means 31. In a step S3, the subtraction image forming means 31 performs the subtraction process on the medical image P and the normal structure image Pc in order to form the subtraction image Psu. In a step S4, the detection means 32 detects the region embedded in the subtraction image Psu, which region is associated with the pixel values (i.e., the signal values representing the image density, the luminance, or the like) larger than the predetermined value, as the abnormal pattern candidate. In a step S5, the output control means 21 operates to display the output information on a display screen of the display means 22. When necessary, in accordance with instructions specified from the input means 90, the output control means 21 changes over the displaying operation of the display means 22, or feeds the output information into the hard copy output means 23. The hard copy output means 23 outputs the output information as a hard copy on a recording medium, such as paper or film.

The operations of the image output apparatus 1 will hereinbelow be described in detail by taking the chest as an example of the object of the medical image P.

In cases where the medical image P of the chest as illustrated in FIG. 9A is inputted into the normal structure image forming means 10, the normal structure image forming means 10 artificially forms the normal structure image, which is illustrated in FIG. 9B and corresponds to the medical image P, i.e. the normal structure image Pc, which represents the normal structure of the chest and is to be compared with the medical image P.

A technique for artificially forming the normal structure image will be described hereinbelow.

In this embodiment, as the technique for artificially forming the normal structure image, the technique of "Active Appearance Model (AAM)" proposed by Cootes, et al., of Manchester University is employed. The technique of AAM is described in "Active Appearance Models" by T. F. Cootes, and C. J. Taylor, Proc. European Conference on Computer Vision, Vol. 2, pp. 484-498, Springer, 1998.

In this embodiment, each of images, which are stored in a data base (hereinbelow referred to as the normal structure DB) for storing the normal structure images representing normal structures of objects, and a shape of an anatomical feature having been extracted from each image, which shape is represented by landmarks, are utilized as instructor data and applied to the technique of AAM. Also, statistical models (i.e., shape variation models, texture variation models, and shape-texture correlation models) of the normal structures of the objects are prepared from the instructor data. In cases where the formed models are utilized, the normal structure image having an arbitrary shape and an arbitrary texture corresponding to the inputted image is capable of being formed artificially.

In order for the statistical models of the normal structures of the objects to be prepared, the images stored in the normal structure DB should preferably be the images having been recorded with image recording operations. However, it may occur that the number of the images stored in the normal structure DB is not sufficient. Therefore, the images stored in the normal structure DB may be the artificial images, which have been prepared at random, while the characteristic and normal fundamental structures of the objects are being kept.

Figure 3:
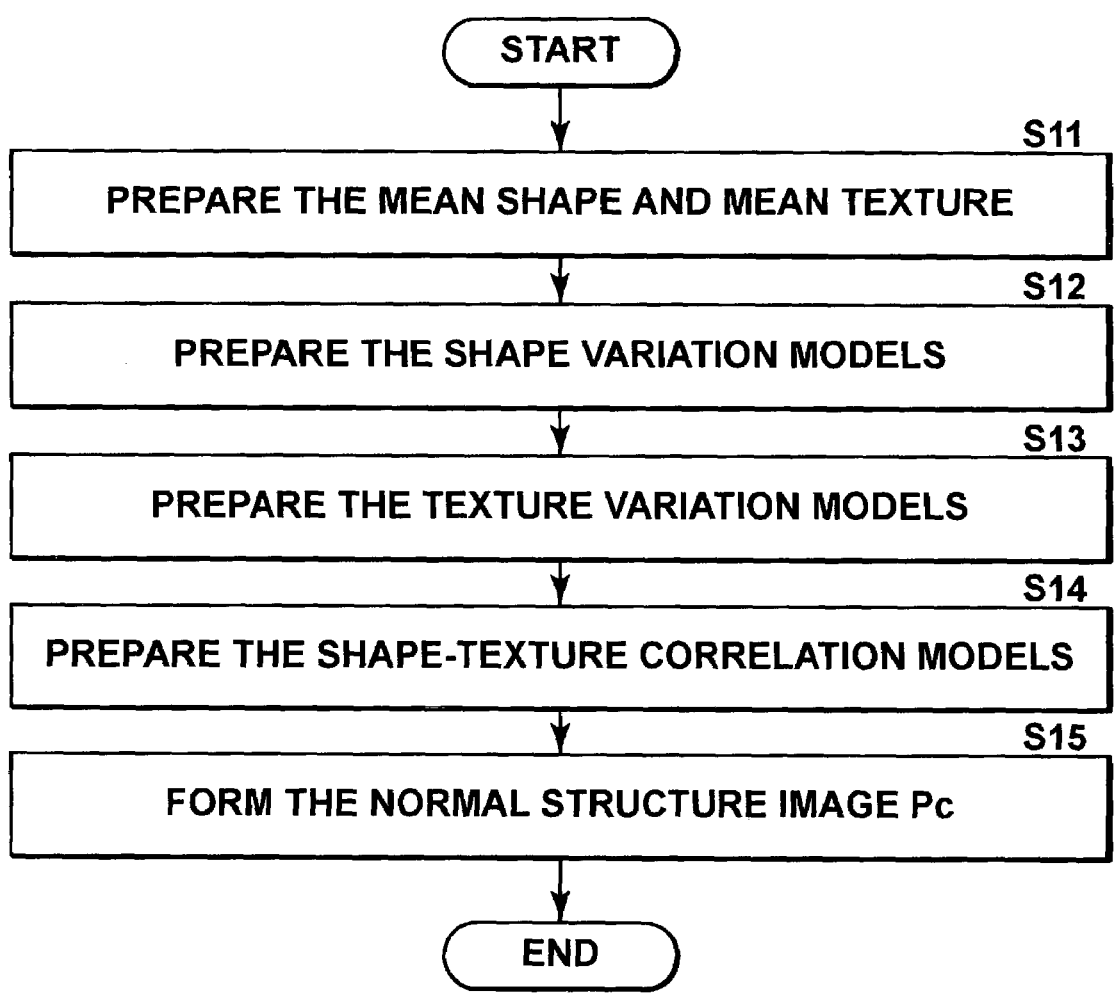
FIG. 3 is a flow chart showing how a normal structure image is formed.

A procedure for artificially forming a normal structure image, which corresponds to an inputted medical image and has an arbitrary shape and an arbitrary texture, will be described hereinbelow by taking the medical image of the chest as an example. FIG. 3 is a flow chart showing how a normal structure image is formed.

(1) Preparation of Mean Shape and Mean Texture
(Step S11)

Figure 4:
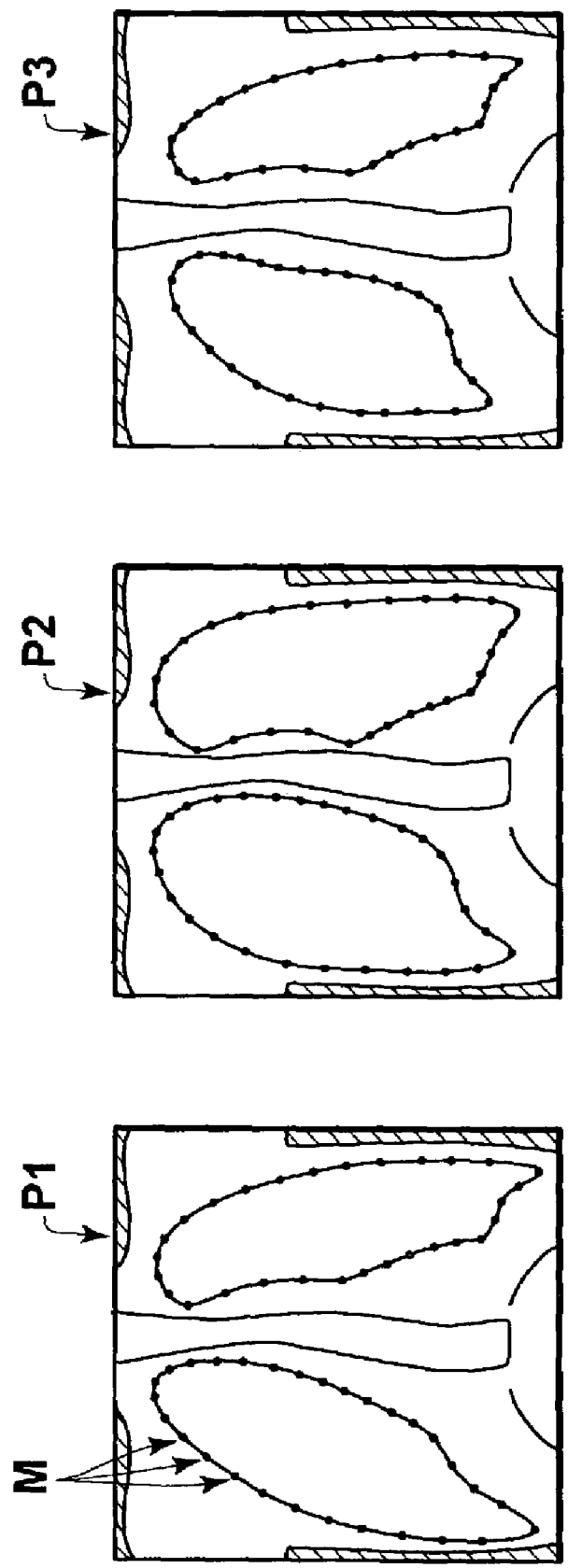
FIG. 4A is an explanatory view showing an example of a chest image stored in a normal structure data base (DB), in which chest image a plurality of landmarks have been appended to outer peripheries of lung field regions.
FIG. 4B is an explanatory view showing a different example of a chest image stored in the normal structure DB, in which chest image a plurality of landmarks have been appended to outer peripheries of lung field regions.
FIG. 4C is an explanatory view showing a further different example of a chest image stored in the normal structure DB, in which chest image a plurality of landmarks have been appended to outer peripheries of lung field regions.
Figure 5:
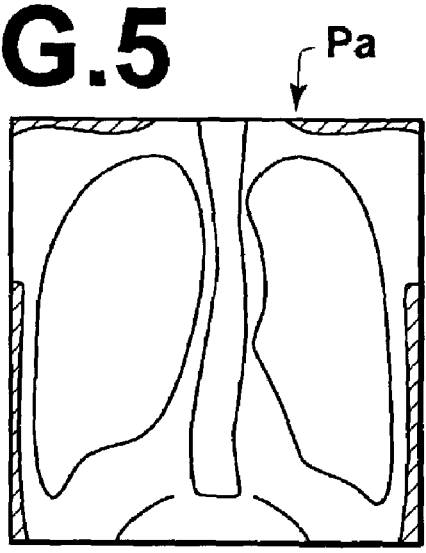
FIG. 5 is an explanatory view showing an image Pa, which represents a mean shape of the chests.

Firstly, shapes of the anatomical features of the objects are extracted as the landmarks from the images having been stored in the normal structure DB. FIG. 4A is an explanatory view showing an example of a chest image P1 stored in the normal structure DB, in which chest image a plurality of landmarks have been appended to outer peripheries of lung field regions. FIG. 4B is an explanatory view showing a different example of a chest image P2 stored in the normal structure DB, in which chest image a plurality of landmarks have been appended to outer peripheries of lung field regions. FIG. 4C is an explanatory view showing a further different example of a chest image P3 stored in the normal structure DB, in which chest image a plurality of landmarks have been appended to outer peripheries of lung field regions. In each of FIG. 4A, FIG. 4B, and FIG. 4C, a plurality of black points represented by M are the landmarks. The points utilized as the landmarks represent equivalent anatomical feature positions in each image. A mean shape of the objects is prepared from the shapes of the images having been extracted as the landmarks. FIG. 5 is an explanatory view showing an image Pa, which represents a mean shape of the chests acting as the objects. In cases where the object shapes in the images are extracted as the landmarks, normalization should preferably be performed previously with respect to parallel translation components. For example, in the cases of the medical images of the chests, position matching should preferably be performed with respect to the top ends of the lung fields and the center points with respect to the horizontal direction.

Figure 6:
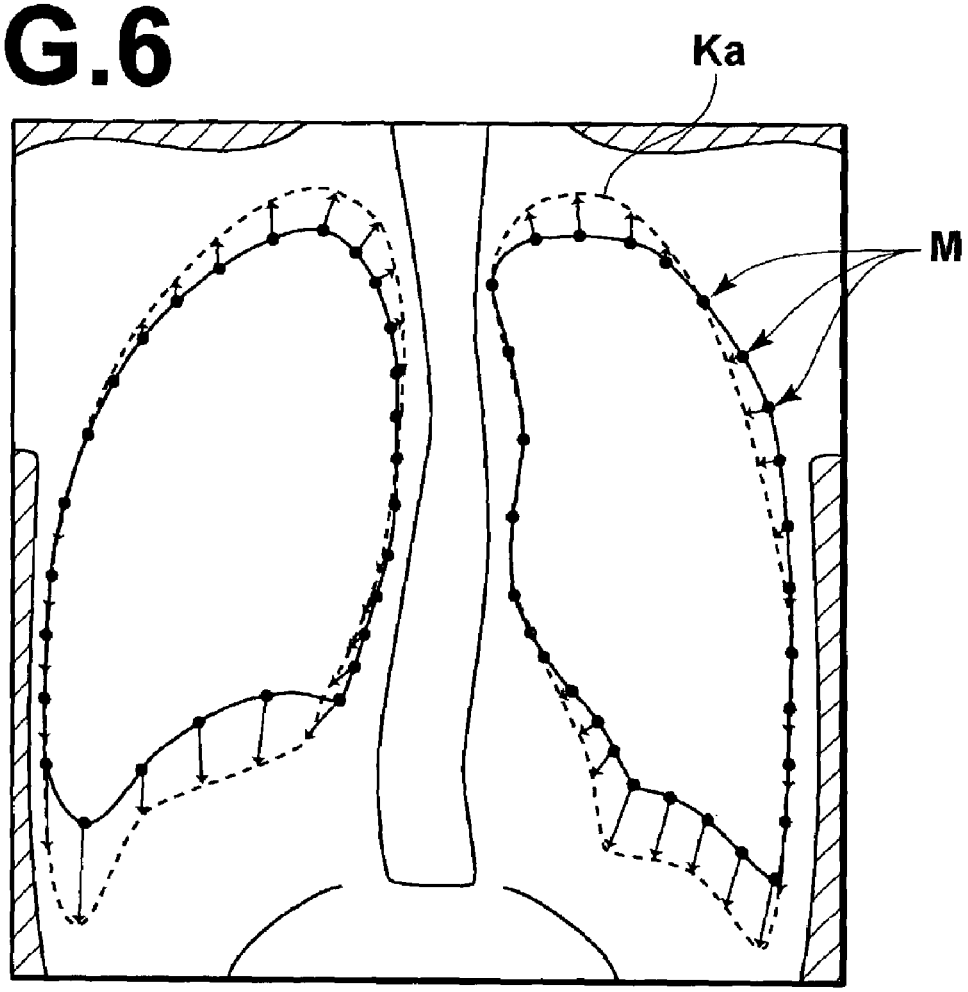
FIG. 6 is an explanatory view showing how each of landmarks, which have been appended to outer peripheries of lung field regions in a chest image, is warped to the mean shape.

Thereafter, in order for each of the images stored in the normal structure DB to be warped to the thus prepared mean shape, a calculation is made to find a shift quantity for shift of each of the landmarks in each image to the mean shape. FIG. 6 is an explanatory view showing how each of landmarks (represented by M in FIG. 6), which have been appended to outer peripheries of lung field regions in a chest image, is warped to the mean shape (represented by Ka in FIG. 6). Also, the shift quantity of each of the landmarks is approximately represented by use of two-dimensional polynomials of the fifth order. The formulas for the approximate representation with the polynomials are shown below.

$$x' = x + \Delta x \tag{1}$$

$$y' = y + \Delta y \tag{2}$$

$$\Delta x = \sum_{i=0}^{n} \sum_{j=0}^{n-i} a_{ij} \cdot x^i \cdot y^j \tag{3}$$

$$\Delta y = \sum_{i=0}^{n} \sum_{j=0}^{n-i} b_{ij} \cdot x^i \cdot y^j \tag{4}$$

wherein x and y represent the coordinates of each of the landmarks in each image, x' and y' represent the coordinates on the mean shape, to which each of the landmarks in each image is warped, $\Delta x$ and $\Delta y$ represent the shift quantity to the mean shape, n represents the degree, and $a_{ij}$ and $b_{ij}$ represent the coefficients.

The coefficients for the approximate representation with the polynomials are calculated by use of the method of least squares.

With respect to each of pixels in each of the images stored in the normal structure DB, the shift quantity to the mean shape is calculated with the formulas shown above. Also, each of the pixels in each of the images is warped to the mean shape. At this time, as for a pixel, which is to be warped to a position having coordinates containing a decimal fraction, instead of the coordinates with an integral number, the pixel value is calculated through approximate representation of the first order from the four neighbors. Specifically, with respect to the four pixels, which surround the coordinates after the warping, the pixel values are distributed in proportion to the distance from the coordinates after the warping to the coordinates of each pixel. Further, a mean texture is prepared from each image, which has been warped to the mean shape.

At this stage, the mean shape of the images stored in the normal structure DB, each of the images having been warped to the mean shape, and the mean texture are obtained.

(2) Preparation of Shape Variation Models (Step S12)

A principal component analysis is made with respect to the shape of the object by use of the shape of each of the images, which are stored in the normal structure DB, and the mean shape. In this manner, each of eigenshapes is calculated. Eigencomponents are calculated by use of a technique described in "Eigenfaces for Recognition" by Matthew Turk, Alex Pentland, Journal of Cognitive Neuroscience, Vol. 3, Num. 1, 1991. An arbitrary shape is capable of being approximately represented by use of a linear sum of the eigenshape and with the formula shown below.

$$x = x_{ave} + Ps \cdot bs \qquad (5)$$

wherein x represents the shape vector $(x_1, y_1, \ldots, x_i, y_i, \ldots, x_n, y_n)$, $x_{ave}$ represents the mean shape vector, Ps represents the eigenvector of the shape, and bs represents the set (combination) of the shape coefficients.

Figure 7A:
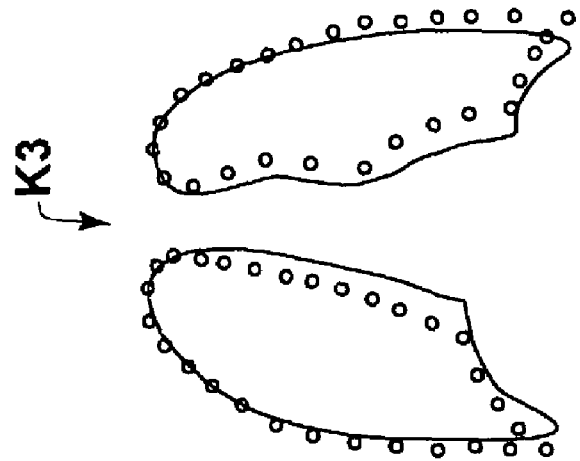
FIG. 7A is an explanatory view showing an example of an eigenshape, which is represented by landmarks.
Figure 7B:
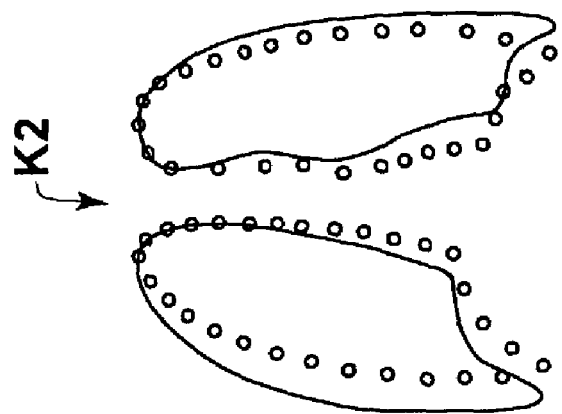
FIG. 7B is an explanatory view showing a different example of an eigenshape, which is represented by landmarks.
Figure 7C:
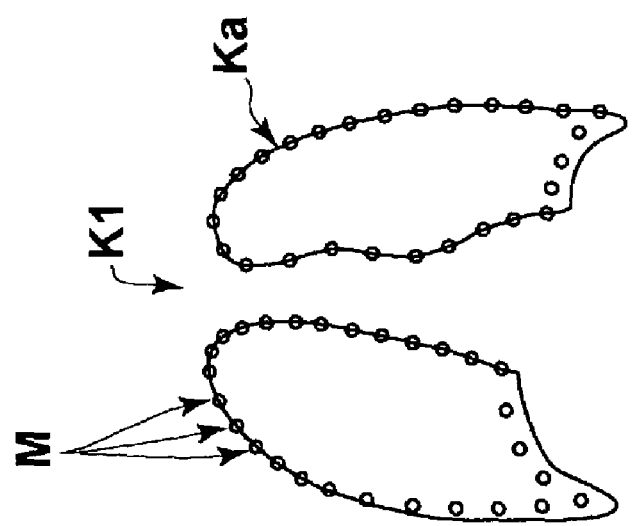
FIG. 7C is an explanatory view showing a further different example of an eigenshape, which is represented by landmarks.

FIG. 7A is an explanatory view showing an example of an eigenshape K1, which is represented by landmarks M, M, . . . FIG. 7B is an explanatory view showing a different example of an eigenshape K2, which is represented by landmarks M, M, . . . FIG. 7C is an explanatory view showing a further different example of an eigenshape K3, which is represented by landmarks M, M, . . . In each of FIG. 7A, FIG. 7B, and FIG. 7C, the solid lines Ka represent the mean shape.

(3) Preparation of Texture Variation Models (Step S13)

Figure 8C:
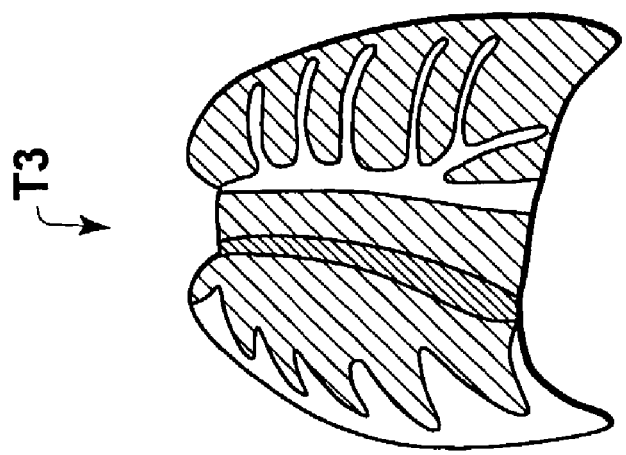
FIG. 8C is an explanatory view showing a further different example of an eigentexture.
Figure 8B:
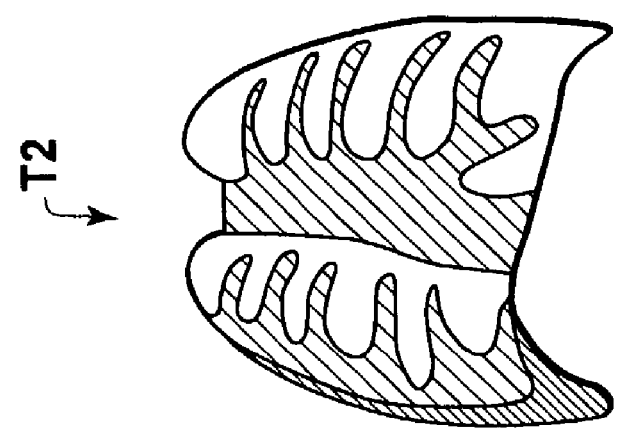
FIG. 8B is an explanatory view showing a different example of an eigentexture.
Figure 8A:
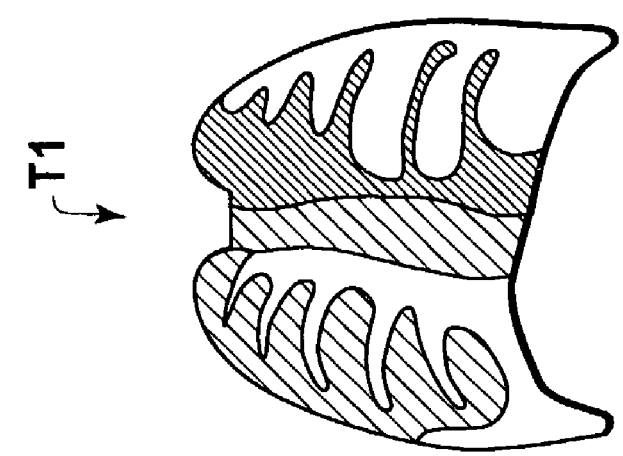
FIG. 8A is an explanatory view showing an example of an eigentexture.

A principal component analysis is made with respect to the texture of the object by use of the texture of each of the images, which a restored in the normal structure DB, and the mean texture. In this manner, each of eigentextures is calculated.

$$g = g_{ave} + Pg \cdot bg \qquad (6)$$

wherein g represents the vector $(g_{11}, g_{21}, \ldots, g_{ij}, \ldots, g_{nn})$ of the gray level (the pixel value of the texture), $g_{ave}$ represents the vector of the mean gray level, Pg represents the eigenvector of the gray level, and bg represents the set of the gray level coefficients. FIG. 8A is an explanatory view showing an example of an eigentexture T1. FIG. 8B is an explanatory view showing a different example of an eigentexture T2. FIG. 8C is an explanatory view showing a further different example of an eigentexture T3.

(4) Preparation of Shape-Texture Correlation Models (Step S14)

The shape of each of the images stored in the normal structure DB is capable of being expressed by use of the shape coefficients bs, which take values projected onto each eigenshape. Also the texture of each of the images stored in the normal structure DB is capable of being expressed by use of the gray level coefficients bg, which take values projected onto each eigentexture. As shown below, principal component analyses are performed on the shape coefficients bs and the gray level coefficients bg, and a value of an appearance parameter for controlling the shape and the gray level is calculated.

$$b = \begin{pmatrix} Ws \cdot bs \\ bg \end{pmatrix} = \begin{pmatrix} Ws \cdot Ps^T \cdot (x - x_{ave}) \\ Pg^T \cdot (g - g_{ave}) \end{pmatrix} \qquad (7)$$

wherein Ws is a diagonal matrix and represents the weight with respect to each shape coefficient.

$$b = Q \cdot c \qquad (8)$$

wherein Q represents the eigenvector, and c represents the appearance parameter for controlling the shape and the gray level (the mean value of c is equal to 0). By the alteration of the value of the appearance parameter, an arbitrary composite image is capable of being formed from the images stored in the normal structure DB.

(5) Formation of Normal Structure Image (Step S15)

With respect to the inputted medical image, the normal structure image is formed with the procedure described below.

1. The value of the appearance parameter, which has been calculated from the mean shape and the image within the mean shape, is set as the initial value. (Normal image signal acquiring means)

2. The value of the appearance parameter is altered little by little and successively from the value of the appearance parameter of the higher-order eigencomponent, and artificial images are thus prepared successively. Also, a value of the appearance parameter, which is associated with the smallest difference between an artificial image and the inputted medical image, is found. (Structure altering vector setting means and structure altering vector adding means)

3. The artificial image, which has been obtained wit the value of the appearance parameter found in the procedure 2 described above, is determined as the normal structure image corresponding to the inputted medical image.

With the technique described above, in cases where the factors, i.e. the mean shape and the mean texture of the object, the eigenshape and the eigentexture, and the eigenvector Q, an approximately arbitrary normal structure image corresponding to the medical image of the object is capable of being formed only with adjustment of the appearance parameter c.

In this embodiment, the factors described above have already been calculated with respect to the medical image of the chest acting as the object. The normal structure image forming means 10 performs only the adjustment of the appearance parameter c and is thus capable of artificially forming the normal structure image Pc, which corresponds to the inputted medical image P of the chest. Therefore, the image output apparatus in accordance with the present invention need not necessarily be provided with the normal structure DB.

The thus formed normal structure image Pc and the inputted medical image P are sent together into the output control means 21. The output control means 21 feeds the medical image P and the normal structure image Pc into the subtraction image forming means 31. The output control means 21 may operate to display the medical image P and the normal structure image Pc on the display screen of the display means 22, or may actuate the hard copy output means 23 to output the medical image P and the normal structure image Pc as a hard copy on a recording medium. Also, the output control means 21 may operate to store the normal structure image Pc in the image storing means 40, such that it is clear which normal structure image Pc corresponds to which medical image P. However, in this embodiment, the displaying of the output information, the outputting of the output information as a hard copy, and the storing of the output information are performed after the processing for detecting an abnormal pattern has been performed.

The subtraction image forming means 31 performs the subtraction process, in which the pixel values of the pixels in the normal structure image Pc are subtracted from the pixel values of the corresponding pixels in the medical image P. The subtraction image forming means 31 thus obtains the subtraction image Psu as illustrated in FIG. 9C and sends the subtraction image Psu into output control means 21 and the detection means 32. Therefore, operation-processed values, which have been obtained from the subtraction process, are outputted for the respective pixels from the subtraction image forming means 31. In cases where there is no difference between the pixel values of the corresponding pixels in the two images, i.e. in cases where the pixels values take an identical signal value, the operation-processed value takes a value of 0. In cases where there is a difference between the pixel values of the corresponding pixels in the two images, the operation-processed value takes a value other than 0.

In this embodiment, by way of example, the medical image P and the normal structure image Pc are taken as high image density-low pixel value types of images, in which the pixel takes a small value as the image density becomes high (i.e., as the image becomes black), and the pixel takes a large value as the image density becomes low (i.e., as the image becomes white).

The detection means 32 detects a region in the inputted subtraction image Psu, which region is associated with pixel values larger than a predetermined value, as an abnormal pattern candidate. Also, the detection means 32 feeds the information, which represents the result of the detection, into the output control means 21. In the medical images for making a diagnosis, such as the medical image P and the normal structure image Pc, a diseased part ordinarily appears as a region having an image density lower than the image density of the normal tissues. Therefore, the pixel values of the diseased part take values larger than the pixel values of the normal tissues. Also, the subtraction image forming means 31 performs the subtraction process for subtracting the normal structure image Pc from the medical image P. Therefore, in cases where a diseased part is embedded in the medical image P, the operation-processed values, i.e. the pixel values, of the diseased part in the subtraction image Psu take positive values. Also, in cases where a diseased part is not embedded in the medical image P, the pixel values in the subtraction image Psu take a value of 0. Actually, it maybe considered that the operation-processed values may often take negative values due to a slight deviation in image density between the medical image P and the normal structure image Pc and due to noise. However, in such cases, since the region in the inputted subtraction image Psu, which region is associated with the pixel values larger than the predetermined value, is detected as the abnormal pattern candidate, no problem will occur with regard to the detection of the abnormal pattern candidate.

Further, since the subtraction image is ordinarily displayed such that the diseased part is black (i.e., has a high image density), the subtraction image Psu may be subjected to gradation inversion, or the subtraction image Psu may be formed from a subtraction process, in which the inputted medical image P is subtracted from the normal structure image Pc.

In this embodiment, the pixel values are employed for making a judgment as to whether the region is or is not the abnormal pattern candidate. Alternatively, the area of the region, the shape of the region, and the like, may be employed as judgment criteria.

The output control means 21 operates to display the output information, i.e. the medical image P, the normal structure image Pc, the subtraction image Psu, and the detection result of the abnormal pattern candidate on the display screen of the display means 22. The display means 22 may be constituted of a CRT display device, a projector, a liquid crystal panel, an organic electroluminescence (EL) device, an FED, or the like.

Figure 10:
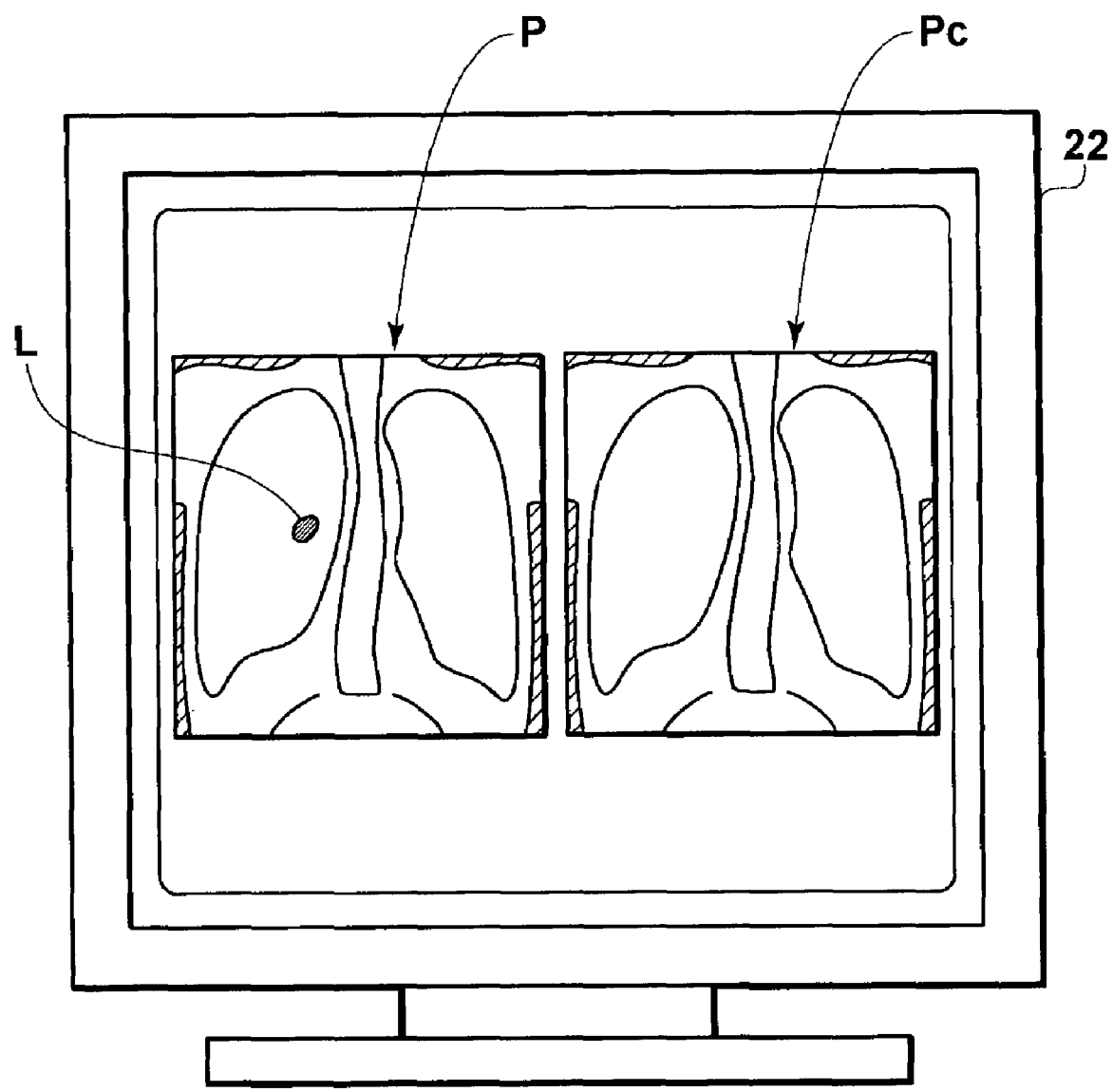
FIG. 10 is an explanatory view showing how the inputted medical image P and the normal structure image Pc are displayed side by side on a display screen.
Figure 11:
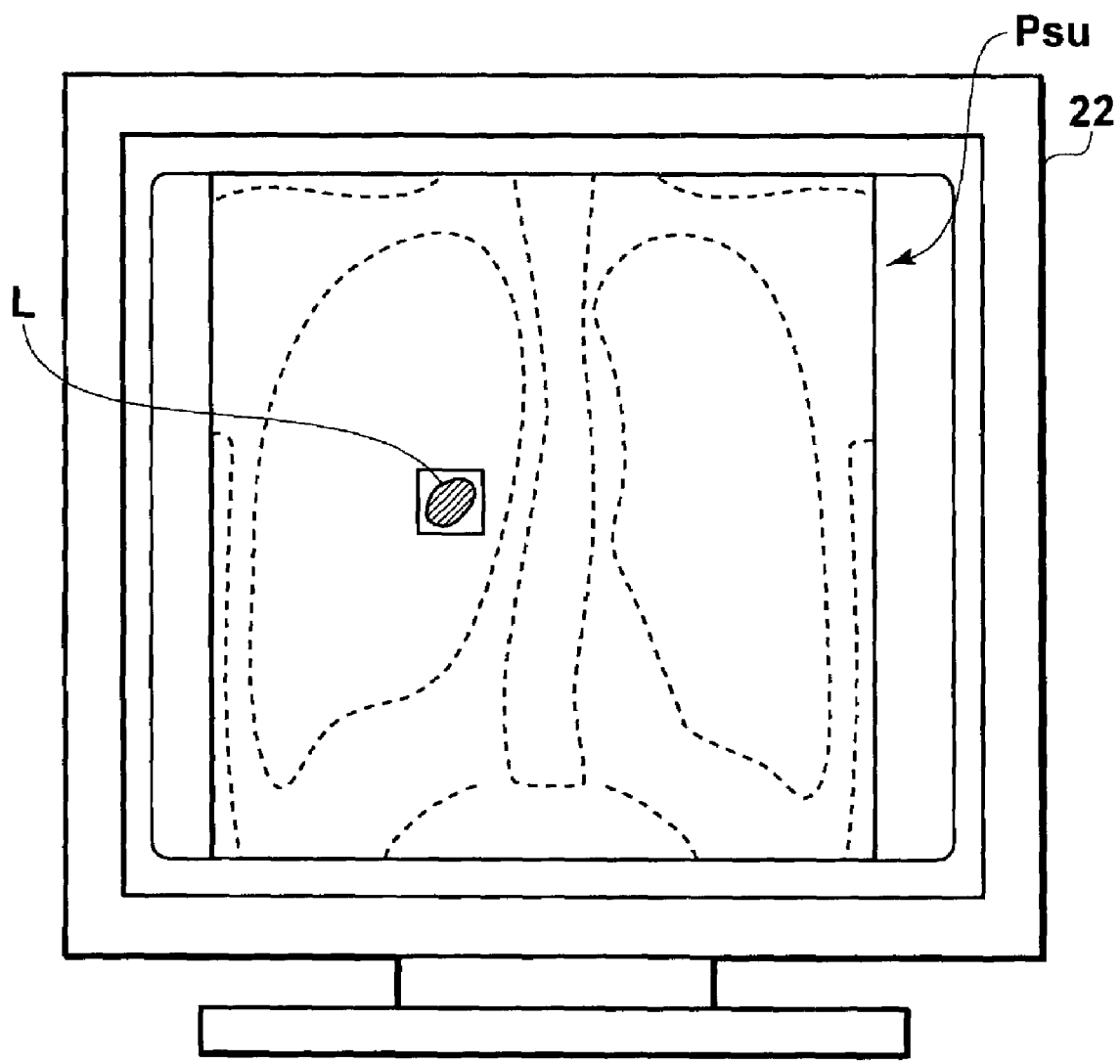
FIG. 11 is an explanatory view showing how the subtraction image Psu and a detection result of an abnormal pattern candidate L are displayed on a display screen, the detection result of the abnormal pattern candidate L being surrounded by a rectangle.

The display pattern on the display screen of the display means 22 is capable of being changed over with an instruction specified from the input means 90. For example, as illustrated in FIG. 10, in order for visual image comparison to be made, the medical image P and the normal structure image Pc may be illustrated side by side. Also, the subtraction image Psu and the region of the abnormal pattern candidate may be displayed by being superposed one upon the other on the display screen, such that the region of the abnormal pattern candidate is appended with a mark for the detection result (such as a rectangle surrounding the abnormal pattern candidate or an arrow mark indicating the abnormal pattern candidate). FIG. 11 is an explanatory view showing how the subtraction image Psu and a detection result of an abnormal pattern candidate L are displayed on a display screen, the detection result of the abnormal pattern candidate L being surrounded by a rectangle Further, all of the images may be displayed simultaneously on the display screen. Furthermore, only one image selected from among all of the images may be displayed on the display screen. In this manner, one of various display patterns is capable of being selected. The output information may be displayed on one display screen (e.g., by use of one unit of CRT display device). Alternatively, the pieces of the output information may be displayed respectively on a plurality of display screens (e.g., by use of one unit of CRT display device for each of the images). When necessary, in accordance with the instructions specified from the input means 90, the output control means 21 may feed the output information, such as the images and the detection results of the abnormal pattern candidate, into the hard copy output means 23. The hard copy output means 23 may output the output information as a hard copy on a recording medium, such as paper or film. Also, the information displayed on the display screen maybe directly outputted as a hard copy. Further, the information displayed on the display screen may be outputted as a hard copy together with various kinds of information, which are not being displayed. Furthermore, only the various kinds of information may be outputted as a hard copy. The hard copy output means 23 may be constituted of a printer, a plotter, or the like.

Also, the output control means 21 feeds the medical image P and the normal structure image Pc into the image storing means 40. The image storing means 40 stores a plurality of medical images P, P, . . . and a plurality of normal structure images Pc, Pc, . . . , such that it is clear which normal structure image Pc corresponds to which medical image P. In cases where the medical image P has already been stored in the image storing means 40, the output control means 21 may feed only the normal structure image Pc into the image storing means 40.

The image storing means 40 may store the information in various storing formats. For example, the normal structure image Pc may be stored by being appended to the medical image P. Alternatively, the normal structure image Pc may be stored by being appended with information common to the medical image P and the normal structure image Pc. Besides the normal structure image Pc, for example, the subtraction image Psu and the information representing the region of the abnormal pattern candidate may be stored in the image storing means 40, such that it is clear which subtraction image Psu and which information representing the region of the abnormal pattern candidate corresponds to which medical image P.

In cases where the output means 20 further comprises network output means connected to a network, in accordance with the instructions given from the input means 90 or the network, the output control means 21 may operate to feed the images and the other kinds of information from the network output means into the network. In such cases, the images and the other kinds of information are capable of being utilized commonly by terminal devices of the network.

The normal structure image Pc, which has been formed by the normal structure image forming means 10, approximately perfectly coincides with the inputted medical image P of the chest, i.e. represents the shape and the texture, which are approximately identical with the shape and the texture of the object, except for a diseased part, in the medical image P. Therefore, in cases where the subtraction processing is performed, a shift of the object, which shift occurs in the cases of the conventional techniques for comparing the inputted medical image P of the patient and the past image of the patient representing the normal structure, does not occur. As a result, an artifact does not occur in the subtraction image obtained from the subtraction processing. Accordingly, the capability of the detection of the abnormal pattern is capable of being enhanced. Also, with the image output apparatus in accordance with the present invention, wherein the normal structure image is formed artificially, the image comparison is capable of being made with respect to a patient whose past image is not available, and the detection of the abnormal pattern candidate is capable of being performed more accurately than in cases where the detection of the abnormal pattern candidate is performed only on a single medical image of the patient.

Figure 12:
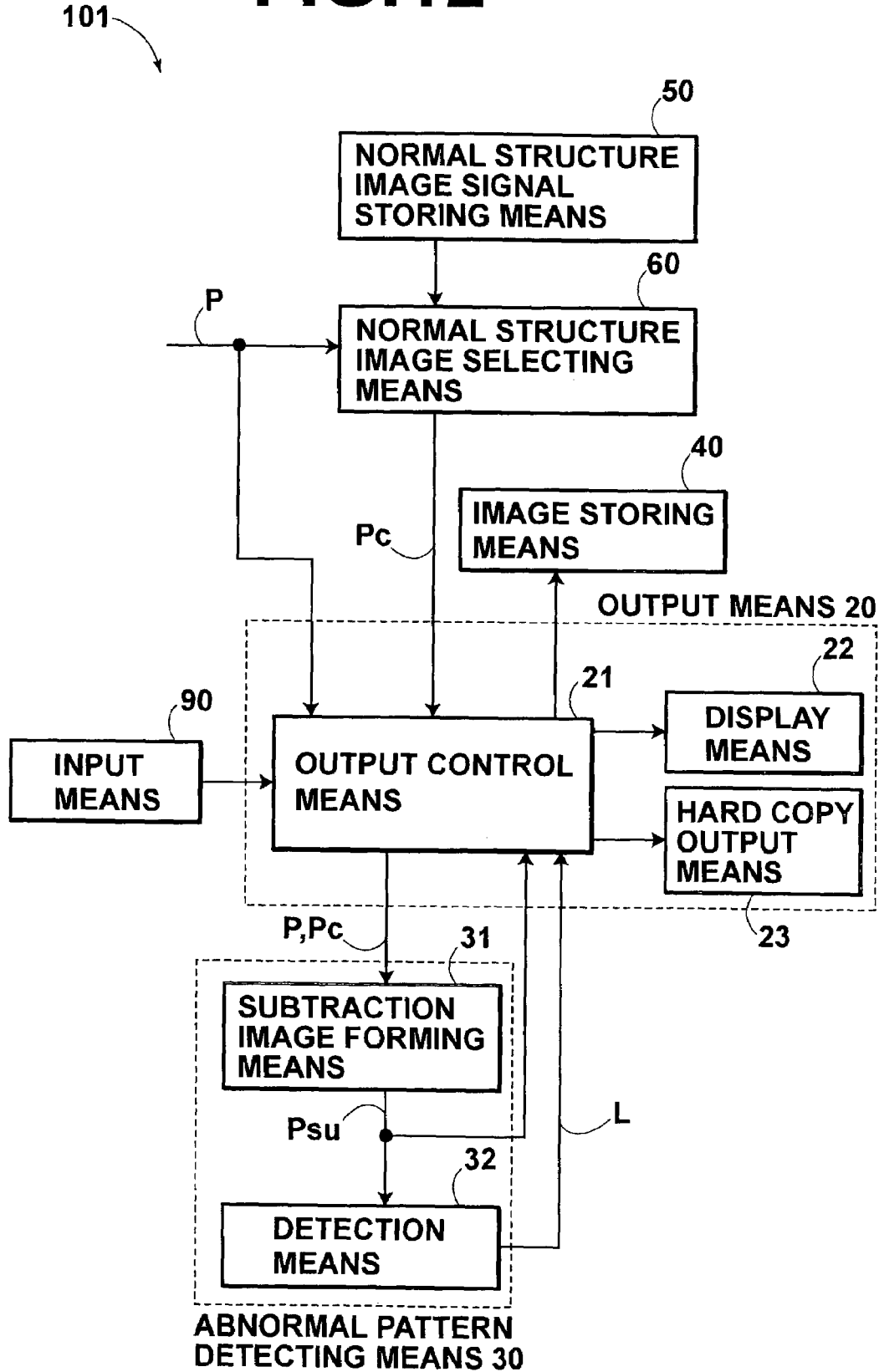
FIG. 12 is a block diagram showing a second embodiment of the image output apparatus in accordance with the present invention.

A second embodiment of the image output apparatus in accordance with the present invention will be described hereinbelow. FIG. 12 is a block diagram showing a second embodiment of the image output apparatus in accordance with the present invention. In FIG. 12, similar elements are numbered with the same reference numerals with respect to FIG. 1.

As illustrated in FIG. 12, an image output apparatus 101, which is the second embodiment of the image output apparatus in accordance with the present invention, is constituted basically in the same manner as in the first embodiment of the image output apparatus 1 shown in FIG. 1, except that normal structure image signal storing means 50 and normal structure image selecting means 60 are employed in lieu of the normal structure image forming means 10 of the image output apparatus 1. The normal structure image signal storing means 50 stores a plurality of different normal structure image signals, which correspond respectively to a plurality of normal structure images having been formed artificially. The normal structure image selecting means 60 selects a normal structure image signal representing a normal structure image Pc, which approximately coincides with the inputted medical image P of the object.

As described above, in the first embodiment, the normal structure image Pc, which is to be compared with the inputted medical image P, is formed in accordance with the medical image P. However, in the second embodiment of the image output apparatus in accordance with the present invention, various types of normal structure images are prepared previously, and the normal structure image Pc, which approximately coincides with the inputted medical image P, is selected from the various types of the normal structure images having been prepared previously. In the second embodiment, the other features are the same as those of the first embodiment.

The techniques for detecting the abnormal pattern candidate from the subtraction image are described in detail in, for example, Japanese Unexamined Patent Publication No. 2002-158923 and may be employed in the embodiments of the image output apparatus in accordance with the present invention.

In the first and second embodiments of the image output apparatus in accordance with the present invention, the normal structure image Pc corresponding to the inputted medical image P is formed artificially or selected and utilized for the image comparison with the medical image P. In this manner, the abnormal pattern candidate is detected. Alternatively, a certain normal structure image Pc may be prepared previously, and the inputted medical image P may be subjected to image processing for preparing a processed medical image P', which corresponds to the normal structure image Pc having been prepared previously. The normal structure image Pc and the processed medical image P' may then be compared with each other, and the abnormal pattern candidate may thereby be detected.

As different examples of utilization of the normal structure image Pc, for example, parameters for the abnormal pattern detecting process, which is performed on the inputted medical image P, may be set in accordance with the normal structure image (signal) Pc. Also, the medical image P and the normal structure image Pc may be inputted into a neural network, and a judgment may be made as to whether a diseased part of the object is present or absent in the medical image P, or as to a degree of malignancy of a diseased part.

The formation of the normal structure image may be performed in the manner described below. Specifically, a computer program for causing a computer to execute image forming processing, the computer program comprising the procedures for: (i) acquiring a normal image signal corresponding to a normal image, which is a medical image representing a normal structure of an object, (ii) setting a plurality of structure altering vectors for altering the structure of the object, and (iii) performing an addition process for adding the plurality of the structure altering vectors, which have been set, to the normal image signal, which has been acquired, whereby a normal structure image signal, which represents a normal structure image of the object, is formed. The computer program may be down-loaded via a computer readable recording medium, such as a CD-ROM, or from a server of a network and installed in a computer. The computer program may thus been executed by the computer.

Also, by the utilization of the technique for forming or selecting the normal structure image, which corresponds to the medical image of the object and represents the normal structure of the object, a service system for furnishing the normal structure image at customer's request is capable of being constructed.

Figure 13:
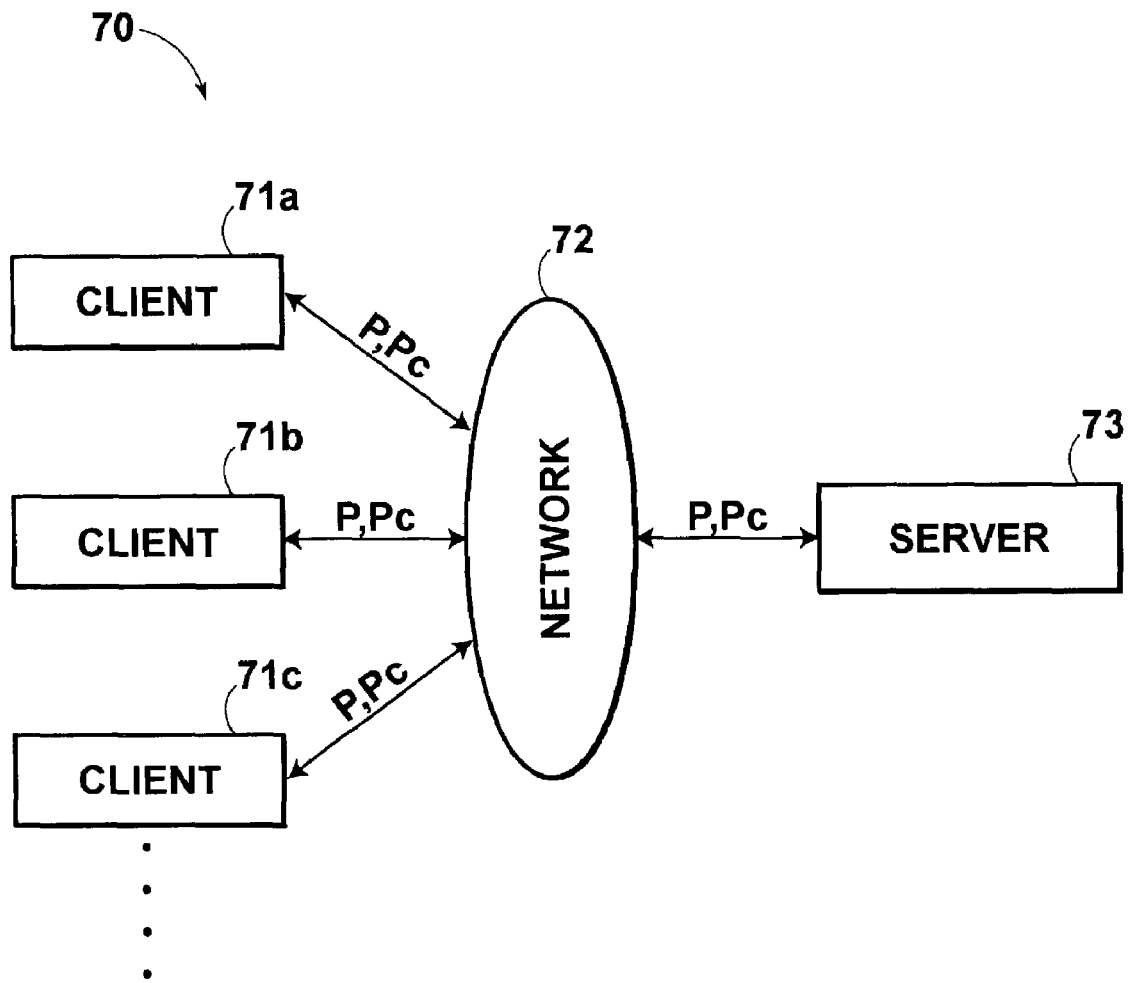
FIG. 13 is a block diagram showing an embodiment of the image furnishing service system in accordance with the present invention.

FIG. 13 is a block diagram showing an embodiment of the image furnishing service system in accordance with the present invention. With reference to FIG. 13, an image furnishing service system 70 comprises: (i) at least one client 71 capable of sending an object image signal P, which represents a medical image P of an object, and (ii) a server 73 connected through a network 72 to the client 71 and provided with the image forming apparatus in accordance with the present invention for forming a normal structure image Pc, which corresponds to the medical image P represented by the object image signal P and represents a normal structure of the object, in accordance with the object image signal P having been sent from the client 71, the server 73 sending the formed normal structure image Pc to the client 71.

Also, it is possible to constitute an image furnishing service system, comprising: (i) at least one client capable of sending an object image signal, which represents a medical image of an object, and (ii) a server connected through a network to the client and provided with an image selecting apparatus in accordance with the present invention for selecting a normal structure image signal representing a normal structure image, which approximately coincides with the medical image represented by the object image signal having been sent from the client, from among a plurality of different normal structure image signals corresponding to a plurality of different normal structure images, which have been formed artificially and represent normal structures of objects, the server sending the selected normal structure image signal to the client.

By way of example, the image furnishing service system 70 may be operated in the manner described below. Specifically, a medical doctor acting as the client sends an object image signal representing an X-ray image of the chest of a certain patient, which image acts as the medical image, from a computer within a hospital through a network, such as an internet, to the server located within an image furnishing service center. In the image furnishing service center, a normal structure image, which corresponds to the X-ray image having been received by the server and represents the normal structure of the chest, is formed artificially. Alternatively, in the image furnishing service center, a normal structure image, which has a structure approximately coinciding with the structure of the received chest X-ray image, may be retrieved from a data base, which stores a plurality of different normal structure images having been formed artificially. The normal structure image signal, which represents the normal structure image corresponding to the chest X-ray image, is then sent to the customer's computer. Alternatively, instead of the normal structure image signal being directly sent to the customer's computer, the normal structure image signal may be stored in a server, from which the client is capable of down-load the normal structure image signal into the client's computer, and information representing the completion of the formation or selection of the normal structure image signal may be given to the client by an electronic mail, or the like. The client may then down-load the normal structure image signal from the server into the client's computer.

With the image furnishing service system described above, a user who does not have the apparatus for forming or selecting the normal structure image (i.e., the image forming apparatus or the image selecting apparatus in accordance with the present invention) is capable of obtaining the normal structure image corresponding to the medical image of the object. Accordingly, the user, who does not have a space for installation of the apparatus for forming or selecting the normal structure image or cannot purchase the apparatus for forming or selecting the normal structure image for reasons of economy, is capable of obtaining the normal structure image signal for the object and utilizing the normal structure image signal for diagnosis, research, training, and the like.

What is claimed is:

1. An image forming method, comprising the steps of:
   i) inputting a medical image of an object, and
   ii) artificially forming a normal structure image, which has a shape and a texture that appear in an image of the object in a normal state;
   the step of artificially forming the normal structure image comprising the processes of:
   storing normal image data constituted by average shapes and average textures of objects in a normal state, statistically obtained from a plurality of medical images;
   setting a plurality of structure altering vectors to deform the average shapes and the average textures; and
   adding the structure altering vectors to the normal image data to generate normal image data that represents a normal structure image having a shape and a texture corresponding to the input medical image;
   the structure altering vectors being unique vectors which are obtained by analyzing the main components of the shapes and the textures of the plurality of medical images; and
   the structure altering vector setting process searching for parameters that result in the smallest different between the normal image data, to which each of the plurality of structure altering vectors multiplied by parameters are added, and the input medical image, to set the parameters and the structure altering vectors.

2. An image forming apparatus, comprising:
   i) object image input means for inputting a medical image of an object, and
   ii) normal structure image forming means for artificially forming a normal structure image, which has a shape and a texture that appear in an image of the object in a normal state;
   the normal structure image forming means comprising:
   a normal image data storage means, for storing normal image data constituted by average shapes and average textures of objects in a normal state, statistically obtained from a plurality of medical images;
   structure altering vector setting means, for setting a plurality of structure altering vectors to deform the average shapes and the average textures; and
   structure altering vector adding means, for adding the structure altering vectors to the normal image data to generate normal image data that represents a normal structure image having a shape and a texture corresponding to the input medical image;
   the structure altering vectors being unique vectors which are obtained by analyzing the main components of the shapes and the textures of the plurality of medical images; and
   the structure altering vector setting means searching for parameters that result in the smallest difference between the normal image data, to which each of the plurality of structure altering vectors multiplied by parameters are added, and the input medical image, to set the parameters and the structure altering vectors.

3. An image forming apparatus as defined in claim 2 comprising image storing means for storing normal structure images, which have been outputted by an output means, such that it is clear which normal structure image corresponds to which inputted medical image.

4. An image forming apparatus as defined in claim 3 wherein the output means is a display means for displaying the images.

5. An image forming apparatus as defined in claim 3 comprising abnormal pattern detecting means for detecting an abnormal pattern, which is embedded in the inputted medical image, in accordance with a comparison between the normal structure image, which has been outputted by the output means, and the inputted medical image.

6. A computer readable medium having embodied thereon a computer program for executing an image forming process, the computer program comprising the procedures of:
  i) inputting a medical image of an object, and
  ii) artificially forming a normal structure image, which has a shape and a texture that appear in an image of the object in a normal state;
  the procedure of artificially forming the normal structure image comprising the steps of:
  storing normal image data constituted by average shapes and average textures of objects in a normal state, statistically obtained from a plurality of medical images;
  setting a plurality of structure altering vectors to deform the average shapes and the average textures; and
  adding the structure altering vectors to the normal image data to generate normal image data that represents a normal structure image having a shape and a texture corresponding to the input medical image;
  the structure altering vectors being unique vectors which are obtained by analyzing the main components of the shapes and the textures of the plurality of medical images; and
  the structure altering vector setting process searching for parameters that result in the smallest difference between the normal image data, to which each of the plurality of structure altering vectors multiplied by parameters are added, and the input medical image, to set the parameters and the structure altering vectors.

7. The method of claim 1, wherein each of the plural image models includes markers defining an outline of equivalent anatomic structures in the different plural image models and forming the composite image comprises calculating averages based on data for each of the respective markers.

8. The method of claim 7, wherein the composite images comprise averages from the markers and pixels adjacent to said markers.

9. The method of claim 8, wherein the normal image includes image data of one of the plural image models which is warped to a position corresponding to the average.

10. The method of claim 9, wherein the warped data represents a shift quantity defined by two-dimensional polynomials of nth degree, where $n \geq 2$.

11. The method of claim 1, further comprising displaying the inputted medical image, the normal structure image, a subtraction image and a detected abnormal pattern.

12. The method of claim 11, wherein the normal structure image is prepared previously, and the inputted medical image is subjected to image processing for preparing a processed medical image which corresponds to the normal structure image, and
  the normal structure image and the processed medical image are compared to each other to detect an abnormal pattern candidate, providing notice to a user of the abnormal pattern candidate.

13. The method of claim 1, wherein the plurality of structure altering vectors are set such that the normal structure image is obtained as a normal structure image which corresponds to a medical image inputted for the detection of an abnormal pattern, and is compared with the medical image by a user for detection of an abnormal pattern candidate.

14. The method of claim 1, wherein artificially forming the normal structure image is performed by a processor.

\* \* \* \* \*